(12) United States Patent
Reese (10) Patent No.: US 7,551,322 B2
(45) Date of Patent: Jun. 23, 2009

(54) IMAGE EDGE FILTERING

(75) Inventor: Robert J. Reese, Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 10/880,977

(22) Filed: Jun. 29, 2004

(65) Prior Publication Data

US 2005/0286082 A1    Dec. 29, 2005

(51) Int. Cl.
*G06K 15/00* (2006.01)
*G06K 9/40* (2006.01)

(52) U.S. Cl. ............... 358/2.1; 358/3.26; 358/3.27; 358/532; 358/477; 382/266; 382/275

(58) Field of Classification Search ........... 358/2.1, 358/3.26, 3.04, 512, 326, 518, 1.9, 3.27, 358/3.15, 532, 447, 477; 382/275, 210, 199, 382/260–269, 270; 348/222.1; 347/180, 347/182, 184; 345/611, 589, 604, 605, 582, 345/601, 602, 628, 543, 599, 560, 562, 565

See application file for complete search history.

(56) References Cited

U.S. PATENT DOCUMENTS

| | | | |
|---|---|---|---|
| 6,466,581 B1 * | 10/2002 | Yee et al. .................. 370/428 |
| 6,823,087 B1 * | 11/2004 | Liu et al. .................. 382/266 |
| 6,993,191 B2 * | 1/2006 | Petrescu .................. 382/205 |
| 6,999,100 B1 * | 2/2006 | Leather et al. ............. 345/611 |
| 7,170,529 B2 * | 1/2007 | Chang .................... 345/604 |
| 2003/0020835 A1 | 1/2003 | Petrescu |
| 2004/0012611 A1 * | 1/2004 | Taneja et al. .............. 345/611 |
| 2004/0141557 A1 * | 7/2004 | Lin et al. ................. 375/240.18 |

FOREIGN PATENT DOCUMENTS

WO    WO-2006/012340 A2    2/2006
WO    WO-2006/012340 A3    2/2006

OTHER PUBLICATIONS

David Goodwin & Darin Petkov, "Automatic Generation of Application Specific Processors", ACM 1-58113-676-5/03/0010, CASE'03, Oct. 30-Nov. 1, 2003.*

David Goodwin & Darin Petkov, "Automatic Generation of Application Specific Processors", ACM 1-58113-676-5/03/0010, CASE'03, Oct. 30-Nov. 1, 2000.*

Huang, Y. W., et al., "Architecture Design for Deblocking Filter in H.264/JVT/AVC", *Multimedia and Expo, 1*, (Sep. 6, 2003),693-696.

Sima, M., et al., "An Efficient Architecture for Adaptive Deblocking Filter of H.264/AVC Video Coding", *IEEE Transactions on Consumer Electronics, 50(1)*, (Feb. 2004),292-296.

* cited by examiner

*Primary Examiner*—David K Moore
*Assistant Examiner*—Steven Kau
(74) *Attorney, Agent, or Firm*—Schwegman, Lundberg & Woessner, P.A.

(57) ABSTRACT

Techniques for image edge filter processing are provided. Data samples surrounding vertical and horizontal edges of an image are acquired and iteratively processed. If the samples are associated with vertical edges, the data associated with the samples are transposed prior to applying a selected filter. The samples are stored in two buffers (one buffer for each unique side of an edge being processed) and selective filters applied thereon. Each sample set includes more than four samples of data. Once the filters are processed, the data in the buffers is written as portions of a modified image. If the samples were associated with vertical edges, then the data is re-transposed out of the buffers as it is written.

11 Claims, 4 Drawing Sheets

IMAGE EDGE FILTERING

TECHNICAL FIELD

Embodiments of the present invention relate generally to image processing, and more particularly to techniques for streamlining image edge filtering.

BACKGROUND INFORMATION

Image filtering is a common process used for improving the quality of a rendered image. Typically, image filters are processed in order to enhance an image's native data for purposes of improving the quality of that image's data when it is rendered on a display device or rendered on print media. Filters may be used for a variety of purposes. For example, some filters remove objectionable artifacts introduced into an image by the process of image compression and decompression.

Image data is actually natively represented as a series of rectangles having pixel data which represents values for light, color, texture, etc. organized into a rectangle which represents the entire image. Many image processing operations artificially subdivide the image into multiple smaller blocks for processing purposes. For example, common image compression algorithms subdivide the image into blocks of pixel data of width and height equal to sixteen pixels. The boundaries between these blocks of pixel data are commonly referred to as edges. The image itself usually depicts scenes or objects which transition within the image to other scenes or objects. A crisp image provides good delineation between different scenes or objects within the image, and often this crisp delineation is achieved through filter processing. A crisp image also does not include visible edges or other objects which were not in the original scene, artifacts which can result from image compression and decompression. Removal of these artifacts is achieved through edge filter processing. If no filter processing takes place for an image, then a viewer may actually see a series of edges appearing within the image in a grid format, corresponding to edges of the blocks used in image compression. Accordingly, filter processing has become a necessity when rendering images reconstituted from compressed images.

One problem with image filter processing is that manipulating and enhancing an image's native data is a processor and memory intensive task. That is, an image is typically represented as pixel data and that pixel data is voluminous. Moreover, determining what modification to make to any particular pixel value may not be completely resolved until values for surrounding pixels are known. Thus, pixel modifications (achieved through filter processing) are often dependent upon surrounding pixels.

Additionally, filters may have to process data rapidly, such as when a video, which is comprised of a series of frames (still images), is dynamically rendered to a display device. In these situations, the filters have to be as efficient as possible so that a viewer of the video does not notice any delay between frames being rendered in the video.

One known technique for improving efficiency is to use Single Instruction Multiple Data (SIMD) operations, producing multiple results for each instruction processed. However, more recent filter definitions may not be well-suited for SIMD techniques due to data-dependent processing (for which each data value may require different operations), because SIMD operations require processing multiple data samples with the same instruction. Additionally, filter definitions may not match SIMD data lengths. For example, a filter defined in terms of four samples, possibly requiring different operations for each set of four values, does not match up well with a SIMD capability of eight data values at once.

Therefore, there is a need for improved image filter processing.

DESCRIPTION OF THE EMBODIMENTS

Figure 1:
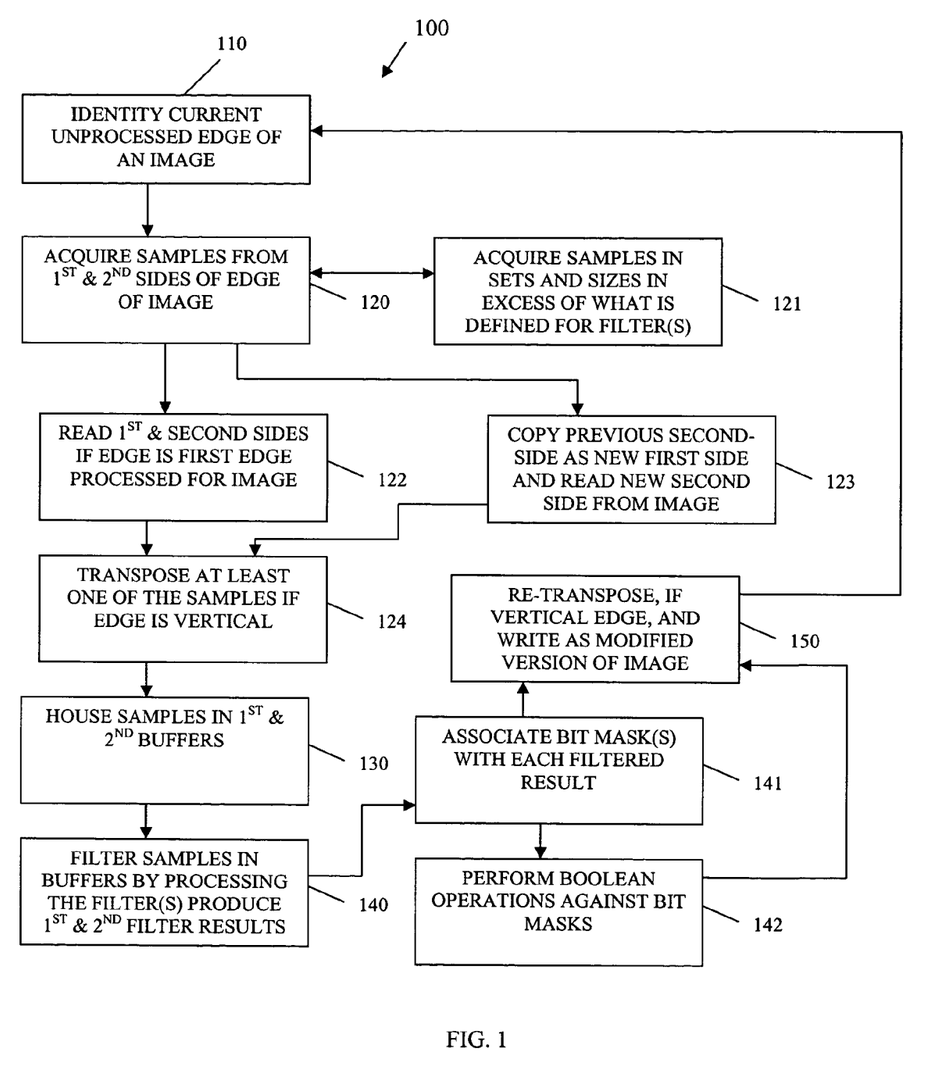
FIG. 1 is a flowchart of a method for processing an image, according to an example embodiment of the invention.

FIG. 1 illustrates a flowchart of one method 100 for filtering images. The method 100 is implemented in a machine accessible medium. However, the method 100 may be implemented in many manners, such as, and by way of example only, the method 100 may be implemented as a series of signals, as a part of a hardware implementation, etc. In an embodiment, the method 100 (herein after "processing") is service within a processor architecture that scans image data and selectively filters the image data using a Single Instruction Multiple Data (SIMD) technique in which multiple portions of the image data are processed by a single filter instruction. This provides improved processing throughput for purposes of filtering an image.

Initially, an image is acquired in a machine-accessible medium from memory, storage, or a combination of memory and storage. The image includes pixels representing lumen, chroma, texture, etc. Selective pixels are grouped together within the image to form various scenes or objects of the image. Filters are processed against the pixels to improve scene or object delineation or to improve color quality, light quality, texture quality, etc. Any existing or custom-developed filters may be used with the teachings presented herein. The image is also natively represented as a series of rectangular boxes having edged perimeter lines. These edges are more visible when the image is natively stored in compressed format and has under gone compression, the edges become discernable upon decompression and are removed using various edge filters.

The lines of the rectangles are vertically and horizontally situated within the image. Whether a particular line is vertical or horizontal is determined based on a native layout for the image or based on an initial selection. In other words, if an image is associated with metadata that defines the default layout or view of the image, this default layout or view will dictate which lines are considered vertical and which lines are considered horizontal.

Alternatively, the determination of which lines are vertical and which are horizontal may be arbitrarily made by selecting an initial set of lines as being horizontal or vertical. This means once a selection is made to consider some lines vertical the other lines that perpendicular to those selected lines are horizontally situated. Thus, selection of a line as being vertical or horizontal is relative, but once that selection is made resolving the horizontal or vertical placement of the remaining lines within the image is done consistently to comport with the original selection. Therefore, as long as a direction is consistently selected as being horizontal or vertical, the determination of what is horizontal and what is vertical is relative.

At 110, a current unprocessed edge of an image is identified. By unprocessed it is meant that the determination as to whether to apply or not to apply one or more filters against data that surrounds that edge has not yet been made. Again, an edge is a line within the image. Lines combine to form rectangles, and some lines are vertically situated and other lines are horizontally situated within each rectangle. Moreover, an edge remains unprocessed until such time as both data samples that surround that edge have been processed.

At 120, a first set of samples is acquired for a first side and a second side of the unprocessed edge. The samples sizes are acquired, at 121, in excess of what is defined by edge filters. That is, a variety of edge filters that are processed against data of the image have predefined sizes for samples that they process. Typically, these sizes are 4 sets of four samples. In various embodiments of this invention, 4 sets of eight-bit or sixteen bit samples are used. These additional sample sizes are processed using SIMD techniques as is described herein and below. Initially, at 122, both the first and second samples are acquired by reading data that surrounds the unprocessed edge from the image. This occurs when the method 100 is iterating for the first time, such that no edges have yet been processed for the image. After the initial iteration of the method 100, the first-side samples are acquired, at 123, by copying previous second-side samples and using them as new first-side samples; the new second-side samples are acquired by reading from data from the image. Edges and their surrounding data samples may be managed and processed using pointers or offsets into the image. Each rectangle within the image is of a pre-defined length (e.g., bytes, pixels, bits, etc.); the pre-defined length permits pointers or off sets into the image data to acquire the samples.

In one embodiment, each sample is acquired initially by reading eight-bits of data from the image. That is, each sample is an 8-bit word of data having potential values of 0-255. However, often any particular filter applied to a data sample may result in a larger value than 0-255; accordingly, in some embodiments at 130, each sample is converted from a native bit-length (e.g., eight bits) to a larger bit-length (e.g., sixteen bits).

At 124, a check is made to determine whether the current unprocessed edge is associated with a vertical edge. If the unprocessed edge is a vertical edge, then, at 124, the first-side and second-side samples are transposed, if this is a first iteration of the method 100. If the unprocessed edge is vertical and this is not a first iteration of the method 100, then only the newly acquired second-side samples are transposed, at 124. Transposition occurs for vertical edges because a serial read of the data samples yields rows or records of data samples, but when the unprocessed edge is a vertical edge the data samples are organized and processed as columns of data.

Thus, by transposing the rows the data samples are organized serially next to one another, such that columns may be associated serially with one another and processed as columns. For example, consider samples identified as row 1: A, B, C, and D; row 2: E, F, G, and H; row 3: I, J, K, and L; and row 4: M, N, O, and P. The rows are transposed as four new rows, row 1: A, E, I, and M; row 2: B, F, J, and N; row 3: C, G, K, and O; and row 4: D, H, L, and P. Essentially, with an unprocessed vertical edge the data vertically surrounding an edge (column of data) is relevant for purposes of applying or not applying a filter. So, by transposing the data the original read rows are translated into columns represented in row formats. The transposed rows may then be processed against one another, since they are data samples of related columns for an unprocessed vertical edge.

At 130, the first-side samples are housed in a first buffer and the second-side samples are housed in a second buffer. The buffers may be represented in memory, registers, storage, or combinations of the same. Once the first-side samples and second-side samples are read, transposed if necessary, and stored in first or second buffers, the values for the data samples may be inspected and filter(s) selected based on those values. That is, when the values are inspected different types of filters may be applied. For example, some filters may enhance or alter lumens, others enhance or alter chroma, others enhance or alter texture, and others smooth out and eliminate edged lines, and so on. Techniques for selecting filters are well-known in the imaging arts; correspondingly, any such image filtering selection technique may be used with the various embodiments of the invention.

At 140, the selected filters are processed against the samples in the first and second buffers. In one embodiment, the first-side and second-side samples are two sets of eight data samples. These two sets of eight are processed by the selected filter operation. Thus, a single selected filter operation is processed against two-sets of eight data samples. This is achieved via SIMD (Single Instruction Multiple Data) techniques, and is a technique to achieve more efficient processing, since rather than processing a single filter operation for multiple iterations (e.g., 8 or 4 iterations) the filter instruction is processed once (single operation) for two sets of eight data samples (multiple data).

In some embodiments, each data sample included in the first-side samples of the first buffer and the second-side samples of the second buffer is also associated with a bit mask value. The bit mask value indicates whether a particular data sample is altered upon processing in a selected filter. Thus, at 141, a bit mask is associated with each filtered result which is produced by processing the selected filter(s). For example, if one data sample had an original value of 250 and after a selected filter was processed had a modified or changed value of 255, then the bit mask value for the modified sample value would be set (value of 1) indicating that the sample value had changed (or vice-versa; e.g., set to 0 to indicate a change occurred).

In some embodiments, the bit masks form strings or arrays and are housed in registers or memory locations during iterations of the method 100. These arrays may then be compared via Boolean operations that add them together or perform a Boolean "or" operation against the two arrays, as depicted at 142. Any resulting arrays indicate which data sample values are to be retained or discarded in favor of original unmodified data sample values.

For example, if an entry in the resulting array is set to "1" this may indicate that the values included within the first and second buffers for that particular sample set is to be retained in a modified version of the image. Conversely, if an entry in the resulting array is set to "0" this may indicate that the values included in the first and second buffers for that particular sample set is to be discarded and the original values for the image retained in a modified version of the image.

This is an improvement over conventional software coded filtering which has relied upon a plurality of multiple dependent conditional statements in order to resolve whether a modified sample value is to be retained or discarded. In other words, conventionally a determination as to whether to accept modified sample values over original and unmodified sample values was based on a plurality of conditional logic that was processed after a filter executed. This was processor and memory intensive and delayed the processing throughput for rendering an image.

Embodiments of this invention do not rely on multiple conditional statements to decide whether to accept or reject a modified sample value; rather, in some embodiments, this is achieved via arrays of bit masks that may be processed against one another using Boolean operations in a single instruction.

After the filters are processed against the data samples in the buffer, at 140, and after any optional bit masks are compared using Boolean operations, at 141 and 142, a check is again made, at 150, to determine if the current unprocessed edge is a vertical edge. If the unprocessed edge is a vertical edge, then, at 150, the data samples are re-transposed out of the buffers and written out of the buffers as modified portions of an image. Also, in some embodiments, if the data samples were converted to larger bit-lengths, the data sample lengths are reconverted back to their original size.

Again, in some cases, some changed data sample values may not be written from the buffers as modified portions of the image, such as when the resulting bit mask array indicates that original data sample values are to remain unchanged. In these instances, the original values for the data samples that are not to change may be acquired directly from the original image, memory, storage, etc. In some instances, the filtered results are housed in registers or memory and used in combination with the original values for the samples housed in the buffers and the mask arrays during the write operations at 150.

Also, at 150, a check is made to determine whether there are any more unprocessed edges that have not yet been processed within the original image. The method 100 stops iterating if all vertical and horizontal edges have been processed. However, if unprocessed edges remain, then, the method iterates again at 110 for the next unprocessed edge.

Vertical edges are processed successively until no vertical edges remain unprocessed by the method, at which point the horizontal edges are processed. During the method-100 iterations associated with horizontal edges, the data is not transposed into the buffers and out of the buffers. During method-100 iterations, pointers and offsets are updated to point to or refer to new regions of data samples which have not been processed and which are associated with new unprocessed edges. Each region of data samples is processed once for a corresponding vertical edge to which it is associated and once for a corresponding horizontal edge to which it is associated.

Figure 2:
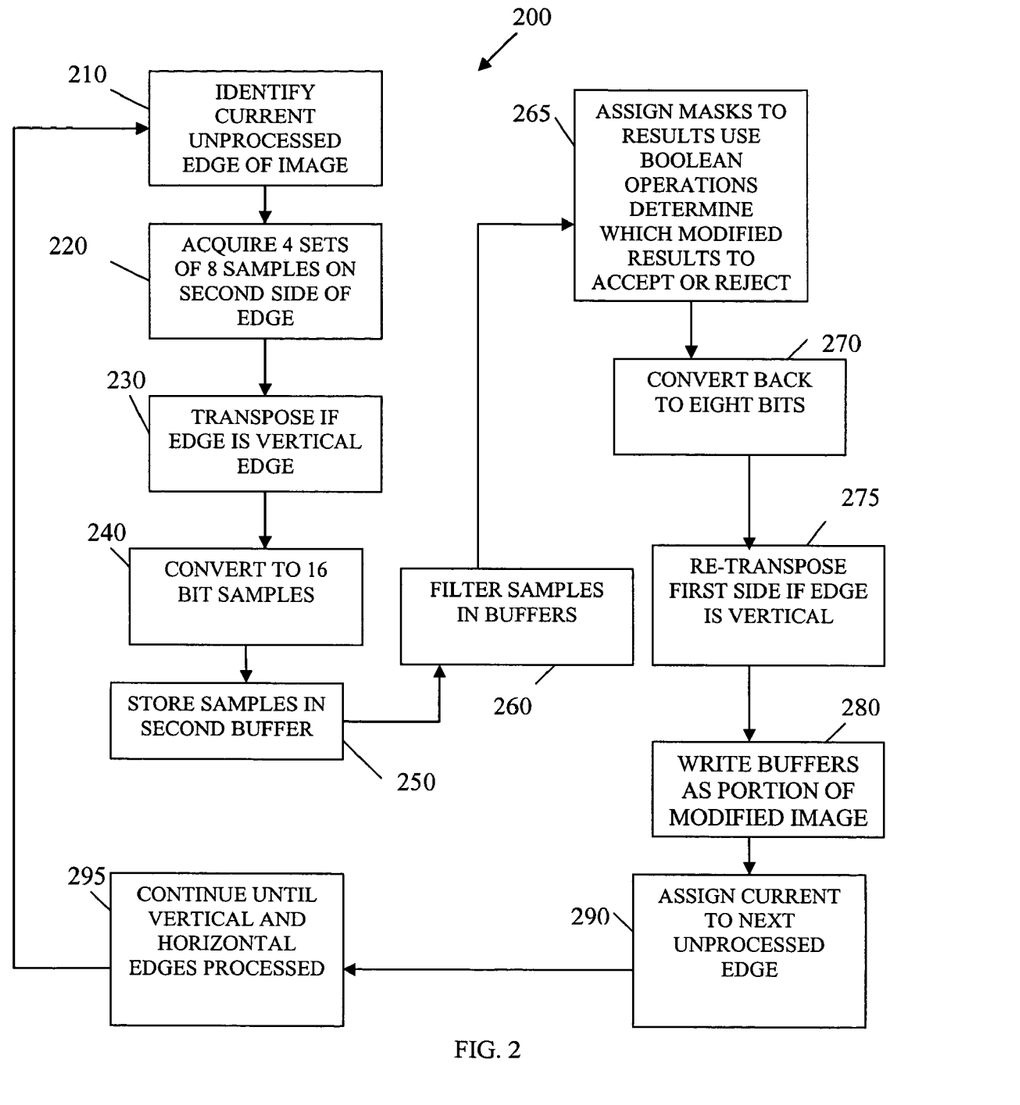
FIG. 2 is a flowchart of another method for processing an image, according to an example embodiment of the invention.

FIG. 2 illustrates a diagram of a method 200 for performing image filtering. The method 200 is implemented in a machine-accessible and readable medium and is optionally accessible over a network. The method 200 may be implemented in hardware, firmware, software, or combinations of hardware, firmware, and/or software. In one embodiment, the method executes and performs image filtering using a SIMD technique, in which sets of eight samples of data from one side of an edge is processed against sets of eight samples of data from the other side of the edge in a series of eight-wide SIMD operations (i.e., the filtering operations are performed in parallel for eight edge positions).

Initially, a current unprocessed edge of an image is identified, at 210. An image is processed against one or more filters for purposes of improving that image's quality (e.g., smoothing to eliminate edge artifacts introduced by image compressing, etc.). Improving quality provides for better scene and object delineation with the image and is therefore more easily comprehended by a viewer of that image. Filtering may be used to render an improved image to a display device or to render an improved image to print media. Pointers or offset counters may be used to iterate through the data of an image for purposes of keeping track of what portions of the data associated with edges have been processed and what portions have not been processed.

At 220, four sets of eight samples are acquired on each side of an unprocessed edge. That is, there is one group of an eight sample set of four which is read or acquired from the image. The group of samples on the first side of an unprocessed edge (required for filtering operations) does not need to be acquired from the image because they are present in the buffers from filtering of the previous edge.

At 230, the collected samples are transposed if the unprocessed edge is a vertical edge. Transposition reconfigures the acquired data samples into a format amenable to the SIMD operations described above. Typically a read operation acquires a single record or amount of data in a serial fashion from the image. For horizontal edges this results in the desired format, with the samples on the edge being contiguous (four read operations acquire four rows of 8 samples each from the second side of the edge). For a vertical edge however, each read operation acquires a row of four samples corresponding to one edge position; eight reads are required to obtain the data for all eight edge positions. The transposition operation reorganizes the eight rows of four samples into the required four sets of 8 samples. If the unprocessed edge is a horizontal edge, then no transposition takes place.

At 240, in an embodiment, newly acquired samples are converted from eight-bit samples to sixteen-bit samples. This is done because the filtering operations may result in intermediate values exceeding 255, so filtering operations are sixteen-bit operations, which consume sixteen-bit data representation as inputs.

At 250, the group of four sets of eight first-side samples are housed or stored in a first buffer and the eight second-side samples are housed or stored in a second buffer. Next, at 260, the two groups are filtered within the buffers using multiple filter definitions using eight-wide SIMD filter operations to obtain multiple filtered results for each filtered position. The particular filters used are based on what type of filter is desired (e.g., strong (heavy), weak (minimal), etc.). The filtering operations may include limiting the amount of change from filtering, called clipping. In one embodiment, the clipping level is defined for four-sample edges, and is used in the eight-wide SIMD operations by creating an eight-wide clipping set of values by combination and replication, from the two clipping levels for the two four-sample edges being filtered.

At 265, the decision is made for each filtered position (eight wide, samples on both sides of the edge) whether to: a) retain the original unfiltered value, or b) substitute a new value from filtering and, if so, from which filter. In one embodiment, bit masks are assigned to each sample within the first buffer and each sample within the second buffer. Because the samples are sixteen-bit values, the masks are also sixteen-bit values of either all zero bits or all one bits for each sample. The masks are created based upon edge-specific inputs to the filter (e.g., do not filter this edge, strong-filter this edge, etc.) and based upon inspected values of the samples prior to filtering. The edge-specific inputs, in one embodiment, are defined for four-sample edges, similar to clipping levels, and similarly require combination and replication to create eight-wide masks for the SIMD operations.

Boolean operations (e.g., AND, OR, NOR, etc. which are also eight-wide SIMD compliant) may then be used to apply masks against the original unmodified sample data and the multiple filtered results to select and obtain the final result for all samples on both sides of the edge. Unconditional SIMD Boolean operations are more processor efficient in determining which filter values to accept or to reject than using a plurality of conditional software logic statements, which has been conventionally the technique of choice. The use of the masks and Boolean operations is also significant because it enables SIMD operations using wider data than the filter inputs. In one embodiment, the filter inputs define clipping and filter selection for edges of length four, a conventional SIMD technique is used to then perform the filtering using matching four-wide SIMD operations. The techniques described herein double the filter throughput by using eight-wide SIMD operations.

At 270, the sample values in the first buffer are re-converted back to eight bits from sixteen bits; and, at 275, if the unprocessed edge is a vertical edge, then the sample values are re-transposed. Next, at 280, the first buffer is written as portions of a modified version of the image. Next, the sample values in the second buffer are copied to the first buffer to be used when filtering the next unprocessed edge. Doing this instead of also storing the second buffer back to the image, avoids the steps of transposition and eight-bit to sixteen-bit conversion for these samples at the beginning of filtering the next unprocessed edge.

At 290, the current unprocessed edge is assigned to a new or next unprocessed edge; and, at 295, the method 200 is processed for another iteration until each vertical and horizontal edge of the image has been processed and iterated through the method 200.

Figure 3:
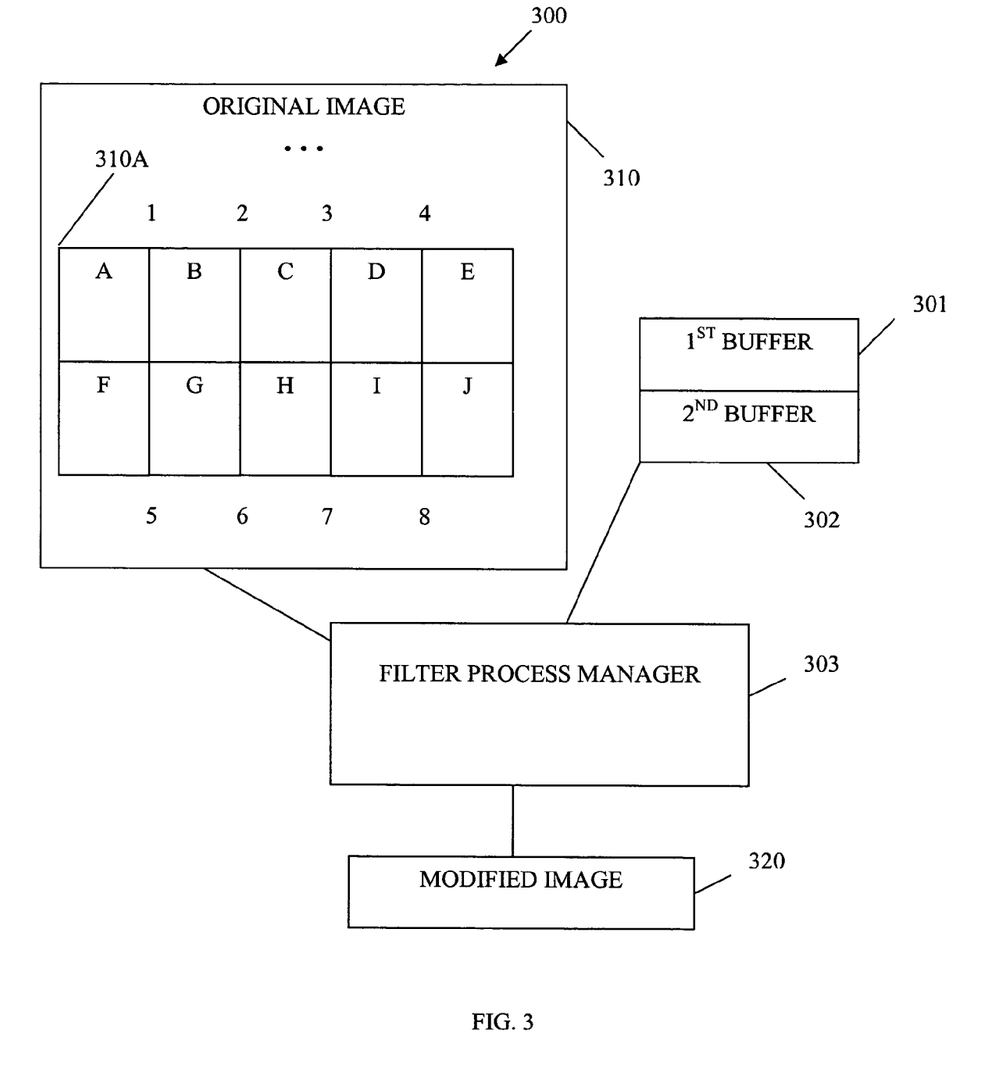
FIG. 3 is a diagram of an image filter processing system, according to an example embodiment of the invention.

FIG. 3 is a diagram of an image filter processing system 300. The image filter processing system 300 is implemented in a machine-accessible or readable medium and is optionally accessible over a network. In one embodiment, the image filter processing system 300 includes techniques presented above with respect to methods 100 and 200 of FIGS. 1 and 2, respectively. The image filter processing system 300 determines when to execute image filters and calls those filters with data managed by the image filter processing system 300 when appropriate to do so. In this way, the image filter processing system 300 improves processing throughput associated with processing image filters by performing single filter operations on multiple data in the manners described herein.

The image filter processing system 300 includes a first buffer 301, a second buffer 302, and a filter process manager 303. The first and second buffers 301 and 302 may be represented within memory, storage, registers, or various combinations of memory, storage, and/or registers. The first and second buffers 301 and 302 house data samples acquired by the filter process manager 303 and any modified values assigned to those samples after the filter process manager 303 selects and executes a desired filter operation. In some embodiments, the first and second buffers 301 and 302 may also be associated with first and second bit-mask arrays. The arrays include a mapped value to a particular data sample within the buffer, and that mapped value is set if a value for the corresponding data sample is altered after a filter operation is executed. In some embodiments, the first and second bit-mask arrays are resident in a register or memory of a device that performs the image edge filtering.

The filter process manager 303 iterates an image 310 for purposes of identifying unprocessed edges of that image 310 and acquiring eight-bit samples of data on a second side of each unprocessed edge. These eight-bit samples are transposed if the current edge being processed is a vertical edge. In one embodiment, these eight-bit samples are also converted to larger bit lengths, such as sixteen bits. Next, the filter process manager 303 stores the second-side samples in the second buffer 302. Care in ordering of the filtering of edges allows the filtered second-side result from one edge to become the first-side samples for filtering the next edge, so these samples are simply copied from buffer 302 to buffer 301 prior to buffer 302 being filled with new samples. This avoids the formatting steps associated with storing and loading these samples.

Once the samples are properly formatted and stored in the buffers 301 and 302, a selection of one or more filters are made by the filter process manager 303. Selection may be based on configured parameters associated with the filter process manager 303, based on inspected values for the data samples housed in the buffers 301 and 302, or based on combinations of the same or other factors. Next, filter operations from the selected filters are executed against the first-side samples and the second-side samples. This may result in one or more data sample values being changed in the first or second buffers 301 and 302.

In some embodiments, bit mask arrays associated with each filtered sample provide the final result selection mechanism, selecting among original samples, and one or more filtered results for each sample. SIMD Boolean operations are used, providing multiple results per operation and avoiding performance-costly data-dependent per-sample conditional branching operations. In some embodiments, the filtered results may be temporarily housed in registers or memory along with the bit mask arrays and processed as needed back to the first and second buffers 301 and 302. In other embodiments, the filtered results and/or the bit mask arrays may be housed within the first and second buffers 301 and 302.

The filter process manager 303 continues to iterate each vertical and horizontal edge of the image 310 until a complete modified image 320 is produced. Two blocks of data samples are processed during a single iteration of the filter process manager 303.

By way of example only, consider a chunk of unprocessed data samples 310A associated with image 310. The data chunk 310A includes 8 vertical edges (numbered 1-8 and represented as lines in FIG. 3), each vertical edge having data two blocks of data samples surrounding it (labeled A-J in FIG. 3).

Continuing with the present example, to filter the samples on either side of edge 2 the filter process manager 303 copies the data in buffer 302 to buffer 301, this data being filtered samples of block B resulting from the previous filtering of edge 1. Next, the filter process manager 303 acquires all eight samples (rows of data) from block C which is on the right side of vertical edge 2, transposes this data (since edge 2 is a vertical edge), converts the data to sixteen-bit data sample values, and stores the data in the first buffer 301.

The filter process manager 303 now selects one or more filters to process against the data in the first and second buffers 301 and 302. These filters perform eight-wide SIMD operations against the data in the first and second buffers 301 and 302 and produce modified versions of data sample values within the first and second buffers 301 and 302. In some embodiments, bit-masks associated with each buffer 301 and 302 may be properly set after the filter operation is executed and used to select from among original data and multiple filtered data for each sample. The final selection for all samples is stored in buffers 301 and 302.

Next, the data in the buffer 301 is re-transposed, re-converted back to eight-bit sample sizes, and written out as a modified portion of the original image 310. The iterations continue with vertical edge 3, and finally 4. Once the vertical edges are processed, the horizontal edges are processed (not labeled in FIG. 3) during horizontal edge iterations the data samples are not transposed going into the buffers or re-transposed coming out of the buffers. When all edges are processed, a complete modified image 320 is created.

Figure 4:
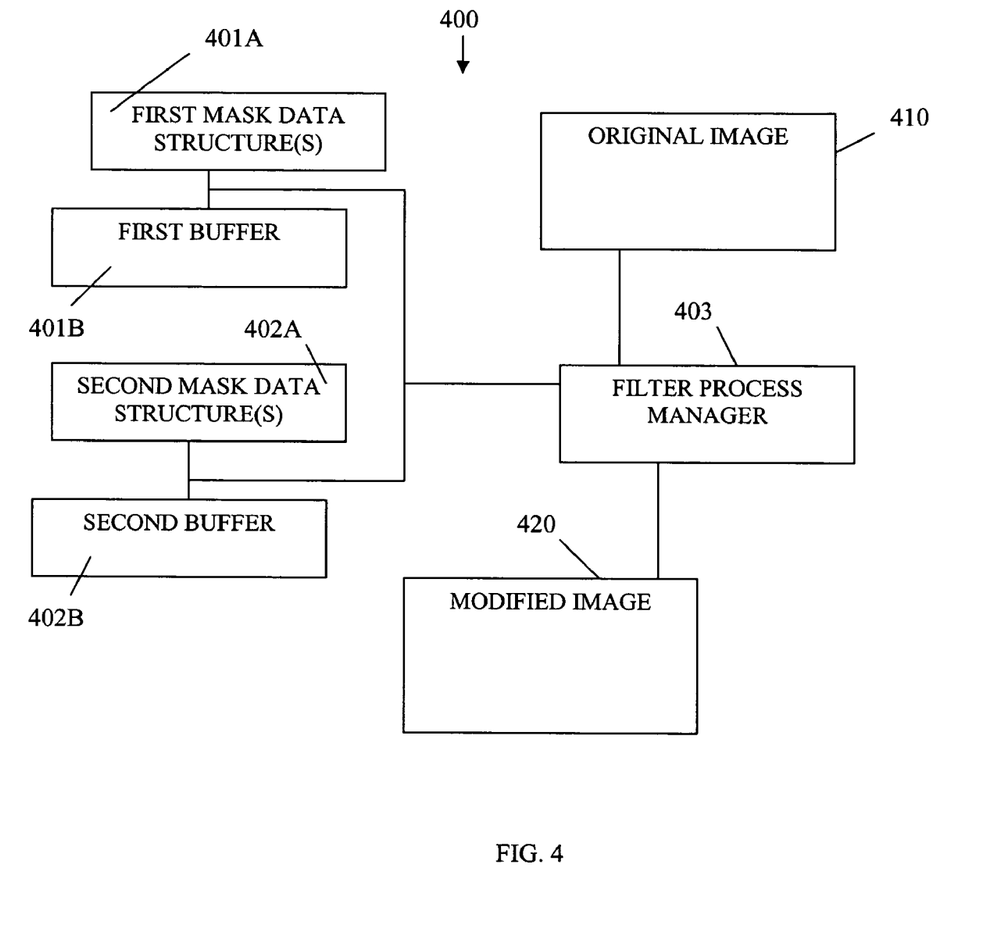
FIG. 4 is a diagram of an image filtering processing apparatus, according to an example embodiment of the invention.

FIG. 4 illustrates a filter processing apparatus 400, according to an example embodiment of the invention. The filter processing apparatus 400 is implemented in a machine-accessible or readable medium and is optionally accessible over a network. In one embodiment, the filter processing apparatus 400 implements various portions of the methods 100 and 200 of FIGS. 1 and 2 and the system 300 of FIG. 3.

The filter processing apparatus 400 includes a first mask data structure 401A associated with a first buffer 401B, a second mask data structure 402A associated with a second buffer 402B, and a filter process manager 403. The mask data structures 401A and 402A may be any custom-defined data structure or object. In one embodiment, the mask data structures 401A and 402A are bit arrays or strings, where each entry of the array or string corresponds to a particular data sample housed in one of the buffers 4011B or 402B.

Each entry within the mask data structures 401A and 402A include a value. A set value (e.g., 1 or yes) may mean that a data sample value was changed from its original value within a particular buffer 401B or 402B after a filter operation was processed. Alternatively, a set value may mean to keep unchanged values for particular data samples from what was provided with the original image 410. That is, set may be configured to indicate an action to take, such as to keep unchanged values. The unset value (e.g., 0 or no) may mean that any changed values for data samples after applying a filter are to be accepted as portions of a modified version of the original image 410. Each entry's value within the mask data structures 401A and 402A informs the filter process manager 403 as to whether to filtered values for the data samples or to reject those values in favor of values that were originally provided for those data samples in the original image 410.

During operation of the filter processing apparatus 400, the filter process manager 403 iterates the vertical and horizontal edges of the original image 410 until each vertical and horizontal edge has been processed by the filter process manager 403. Each vertical edge is processed and then each horizontal edge is processed. If, during a particular iteration, the edge being processed is a vertical edge, then data samples are transposed before being stored in the first and second buffers 401B and 402B. In some embodiments, the data samples are also converted to larger bit lengths or sizes before being processed by filters within the buffers 401B and 402B in order to account for a filter operation that may produce larger bit lengths.

Next, the filter process manager 403, selects and executes a filter operation against the data samples in the first buffer 401B and the data samples in the second buffer 402B. This may produce modified data sample values. The first and second mask data structures 401A and 402A will also change values for its entries if a particular entry's corresponding data sample value was changed after processing a filter operation.

Finally, the first and second data structures 401A and 402A provide instruction to the filter process manager 403. The instruction is a value for each entry within the first and second data structures 401A and 402A which corresponds to data sample values in the first and second buffers 401B and 402B. The value of a particular entry in the first and second data structure 401A and 402A instructs the filter process manager 403 to accept the filtered value of a data sample within one of the buffers 401B and 402B or to reject the value in favor of an original data sample value provided in the original image 410.

The filter process manager 403 then reconverts any previously converted bit lengths for the buffers 401B back to their original sizes, and re-transposes the data samples in the buffer 401B if the current processed edge is a vertical edge, and writes the data out of the buffer 401B as portions of a modified version of the original image 410. The filter process manager 303 continues to iterate through the original image 410 until each vertical and horizontal edge of the original image 410 is processed. Upon completely iterating each vertical and horizontal edge, a complete modified image 420 is produced.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A method, comprising:

acquiring first-side samples and second side samples that surround an edge of an image, the samples are in excess of what is defined by one or more filters that process the samples, wherein the one or more filters include predefined sizes that the one or more filters can process and recognizing that sizes of the first-side and second side-samples exceed those predefined sizes;

transposing at least one of the samples, when the edge is a vertical edge by organizing column data as row data;

storing the samples; and filtering the samples to create results by inspecting values for the first-side and the second-side samples to select different types of filters in response to the values, wherein the values when compared to configured parameters indicate whether the different types of the filters are to be processed to alter lumens, alter chroma, alter texture, and to smooth out or eliminate edge lines in the image, and wherein the filtered-first side samples are associated with first bit mask values that form a first string and the filtered-second side samples are associated with second bit mask values, each bit mask value is set when processing one or more of the filters alters a particular side sample to which that bit mask value is associated, the strings are housed in registers, a Boolean OR operation is performed on the two strings resulting in a third string, each bit mask value in the third string is then inspected and when set a filtered-first side sample and a filtered second side sample to which that particular set bit mask value is associated with is retained in a modified version of the image, and when an inspected bit mask value from the third string is not set a corresponding filtered-first side sample and a corresponding filtered second side sample to which that particular unset bit mask value is associated with are discarded and original versions of the first-side and second-side samples are retained in the modified version of the image, the modified version of the image is achieved in a single operation by inspection of the third string.

2. The method of claim 1, wherein acquiring includes:
acquiring the first-side samples by copying from previous contents that were associated with previous second-side samples during a previous iteration of the method; and
acquiring the second-side samples by reading from the image, and wherein if the edge is the vertical edge then performing the transposition on the second-side samples and not the first-side samples.

3. The method of claim 1, wherein filtering includes processing the one or more filters against the samples using Single Instruction Multiple Data (SIMD) techniques.

4. The method of claim 3, wherein filtering includes processing four-wide or eight-wide SIMD operations against the first-side samples and second-side samples.

5. The method of claim 1 further comprising, re-transposing the results if the samples are associated with the vertical edge and writing them back as a portion of the modified version of the image.

6. The method of claim 1 further comprising, converting at least one of the samples from one length to a larger length.

7. A method, comprising:
identifying a current unprocessed edge of an image;
acquiring four sets of eight samples on a first side and four sets of eight samples on a second side of the current unprocessed edge;
transposing the samples when the current unprocessed edge is a vertical edge by organizing column data as row data for the vertical edge;
storing the samples; and
filtering the first-side samples and second side-samples by inspecting values for the first-side and the second-side samples to select different types of filters in response to the values, wherein the values when compared to configured parameters indicate whether the different types of the filters are to be processed to alter lumens, alter chroma, alter texture, and to smooth out or eliminate edge lines in the image, and wherein the filtered-first side samples are associated with first bit mask values that form a first string and the filtered-second side samples are associated with second bit mask values, each bit mask value is set when processing one or more of the filters alters a particular side sample to which that bit mask value is associated, the strings are housed in registers, a Boolean OR operation is performed on the two strings resulting in a third string, each bit mask value in the third string is then inspected and when set a filtered-first side sample and a filtered second side sample to which that particular set bit mask value is associated with is retained in a modified version of the image, and when an inspected bit mask value from the third string is not set a corresponding filtered-first side sample and a corresponding filtered second side sample to which that particular unset bit mask value is associated with are discarded and original versions of the first-side and second-side samples are retained in the modified version of the image, the modified version of the image is achieved in a single operation by inspection of the third string.

8. The method of claim 7 further comprising:
re-transposing the first-side samples and second-side samples from first and second buffers, if the current unprocessed edge is the vertical edge; and
writing the first and second buffers as a portion of the modified version of the image.

9. The method of claim 7, further comprising assigning the current unprocessed edge to a next unprocessed edge within the image and repeating the method until each vertical and horizontal edge of the image has been processed.

10. The method of claim 7, further comprising assigning the current unprocessed edge to the next unprocessed edge within the image, and wherein the four sets of eight samples on the second side become the four sets of eight samples on the first side of the next unprocessed edge, and wherein the transposition is avoided for the samples on the first side if the next unprocessed edge is the vertical edge and transposition occurs for the second side samples.

11. The method of claim 7, further comprising converting the samples from eight-bit samples to sixteen bit samples for both the first and second sides before filtering.

* * * * *